United States Patent [19]

Hayashida et al.

[11] Patent Number: 4,915,192
[45] Date of Patent: Apr. 10, 1990

[54] ARRANGEMENT FOR OIL COOLER FOR FINAL DRIVE UNIT

[75] Inventors: Tsutomu Hayashida, Sagamihara; Atsushi Shizuta, Okada, both of Japan

[73] Assignee: Nissan Motor Co., Ltd., Japan

[21] Appl. No.: 241,897

[22] Filed: Sep. 8, 1988

[30] Foreign Application Priority Data

Sep. 17, 1987 [JP] Japan ............................ 62-140907[U]

[51] Int. Cl.⁴ .............................................. B60K 17/16
[52] U.S. Cl. .................................. 180/309; 74/606 A; 165/41; 184/104.1; 180/339; 180/89.2
[58] Field of Search ...................... 180/68.4, 68.6, 309, 180/89.2, 88, 905, 76, 339, 375; 165/41, 44, 47; 74/606 A; 296/204; 184/104.1

[56] References Cited

U.S. PATENT DOCUMENTS 4,398,081 8/1983 Moad .................................. 165/41
4,557,519 12/1985 Matsuura ............................ 296/204

FOREIGN PATENT DOCUMENTS 3116595 11/1982 Fed. Rep. of Germany ........ 180/88

Primary Examiner—David M. Mitchell
Attorney, Agent, or Firm—Leydig, Voit & Mayer

[57] ABSTRACT

An oil cooler for a final drive unit is disposed under a vehicle floor and installed on a rear elevated portion of a rear floor panel and under a rear seat. In one embodiment, bracket arrangement for installing the oil cooler under the vehicle floor serves not only as a support for the oil cooler but as a deflector or an air introducing device for efficiently introducing air to the oil cooler.

6 Claims, 4 Drawing Sheets

ARRANGEMENT FOR OIL COOLER FOR FINAL DRIVE UNIT

BACKGROUND OF THE INVENTION

1. Field of the Invention

The present invention relates in general to automotive vehicles and more particularly to an arrangement for an oil cooler for a final drive unit in an automotive vehicle.

2. Description of the Prior Art

In a front-engine rear-drive vehicle, a driving force from an engine is transmitted through a propeller shaft to a final drive unit from which it is distributed to a set of rear wheels. The final drive unit consists of a reduction gear and a differential which are housed within a casing filled with lubricating oil.

The lubricating oil tends to be heated up to a high temperature when the vehicle runs at high speeds for long periods of time. In order to prevent the lubricating oil from being heated up to a high temperature, it is conceivable to provide the final drive with an oil cooler. However, the oil cooler requires a space adjacent the vehicle rear end and under the floor panel, causing a problem that the fuel tank needs to be smaller in size or the passenger compartment or the luggage compartment needs to be smaller in size. FIG. 8 shows a prior art arrangement wherein due to installation of an oil cooler 2 for a final drive unit 4 on a vehicle 1 the fuel tank 3 needs to be smaller in size. In case the vehicle 1 is not provided with such an oil cooler 2, the fuel tank 3 can be larger as shown by the phantom line. Reference numeral 5 indicates a vehicle floor and 6 indicates an oil pump for circulating lubricating oil between the oil cooler 2 and the final drive unit 4.

SUMMARY OF THE INVENTION

In accordance with the present invention, there is provided a novel and improved arrangement for an oil cooler for a final drive unit. The arrangement comprises a rear seat, a vehicle floor and an oil cooler for a final drive unit. The oil cooler is disposed under the vehicle floor and installed thereon under the rear seat.

In one embodiment, a bracket means is provided for installing the oil cooler under the vehicle floor. The bracket means consists of a bracket and an air duct which cooperate to define a box-like section and house the oil cooler. The bracket is angled to have a first flat deflector wall extending forwardly and downwardly from the oil cooler and a second flat deflector wall extending forwardly and upwardly from a front end of the first flat deflector wall. The air duct has a bottom wall and a pair of side walls. The bottom wall extends forwardly from the oil cooler and slants downwardly with an increasing slope towards its front end. Each of the side walls has an upper edge, the forward part of which is separated from the bracket and extends increasingly away from the bracket as it extends forward.

The above arrangement is effective for overcoming the above noted disadvantages and shortcomings inherent in the prior art arrangement.

It is accordingly an object of the present invention to provide a novel and improved arrangement for an oil cooler for a final drive unit which makes it possible to attain installation of the oil cooler without reducing the size or volume of the fuel tank, pasenger compartment, luggage compartment, etc.

It is another object of the present invention to proide a novel and improved arrangement of the above described character which can increase the cooling ability of the oil cooler and thereby reduce the size of the oil cooler.

It is a further object of the present invention to provide a novel and improved arrangement of the above described character which contributes to a reduction of the vehicle weight.

DESCRIPTION OF THE PREFERRED EMBODIMENTS

Figure 1:
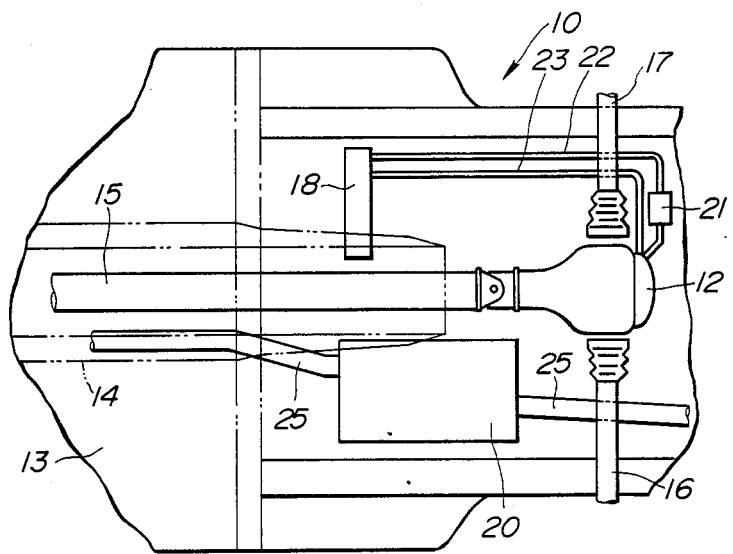
FIG. 1 is a fragmentary bottom plan view of a vehicle underbody incorporating an arrangement for an oil cooler for a final drive unit according to an embodiment of the present invention.
Figure 2:
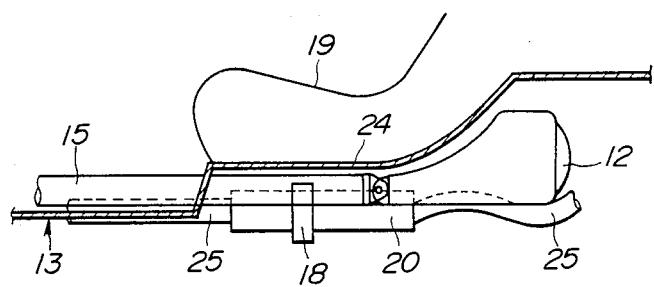
FIG. 2 is a side elevation view of the vehicle underbody of FIG. 1.

Referring first to FIGS. 1 and 2, a vehicle underbody 10 is shown as being provided with a final drive unit 12 and a propeller shaft 15 disposed in a tunnel 14 formed in a vehicle floor 13. The final drive unit 12 is connected with the propeller shaft 15 and distributes a driving force to a set of drive axles 16 and 17. An oil cooler 18 is installed under the vehicle floor 13 at a rear elevated portion 24 thereof beneath a rear seat 19. Further, the oil cooler 18 is arranged to be on the opposite side of the propeller shaft 15 from an exhaust system including an exhaust pipe 25, a muffler 20, etc.

The lubricating oil within the final drive unit 12 is fed to an oil pump 21 and conducted to the oil cooler 18 through a feed pipe 22. The lubricating oil is then returned to the final drive unit 12 through a return pipe 23.

In the foregoing arrangement, it is to be noted that the oil cooler 18 is installed under the vehicle floor 13 at the rear elevated portion 24 thereof and under the rear seat 19, whereby it becomes unnecessary to reduce the size of the fuel tank, the luggage compartment or the passenger compartment.

Figure 3:
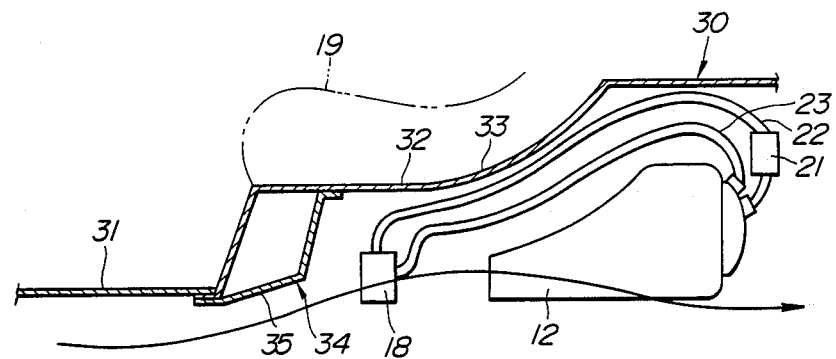
FIG. 3 is a view similar to FIG. 2 but showing another embodiment of the present invention.

FIG. 3 shows another embodiment wherein a vehicle underbody 30 includes a front floor panel 31, a rear floor panel 32 and a rear seat cross member 34. The rear floor panel 32 is attached to the rear end of the front floor panel 31 and has an elevated portion 33. The rear seat cross member 34 is arranged under the front end portion of the rear floor panel 32 to reinforce it. More specifically, the front end of the rear floor panel 32 has an angled cross section which cooperates with the rear seat cross member 34 housing an angled cross section to form a box-like cross section. The oil cooler 18 for the final drive unit 12 is installed under the elevated portion 33 of the rear floor panel 32 and under the rear seat 19.

The angled rear seat cross member 34 has an inclined lower wall 35 directed toward the upper end of the oil cooler 18, i.e. the lower wall 35 is so inclined as to allow its extension to be joined with or pass adjacent the upper end of the oil cooler 18.

With this arrangement, it is to be noted that the direction of air flow caused by movement of the vehicle is deflected as shown by the arrow in FIG. 3 by the effect of the inclined lower wall 35 of the rear seat cross member 34 and therefore the air flow is introduced efficiently to the oil cooler 18, whereby it becomes possible to increase the cooling ability of the oil cooler 18. Therefore it becomes possible to attain a desired cooling of lubricating oil with a small-sized oil cooler and thereby reduce the weight of the vehicle.

Figure 4:
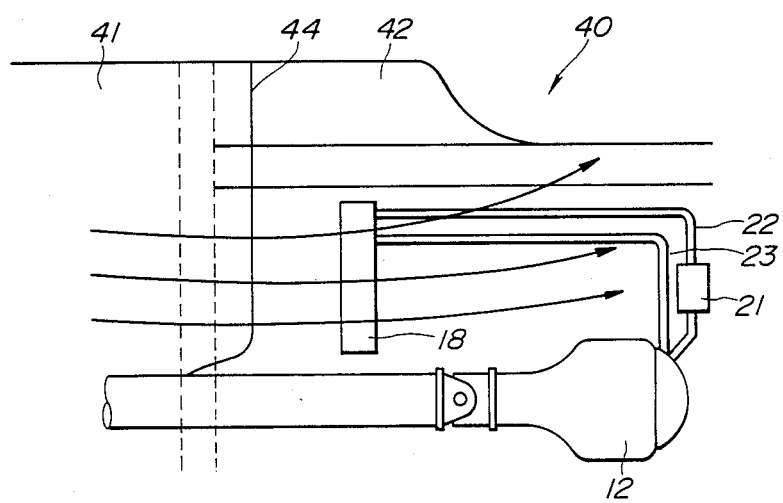
FIG. 4 is an enlarged, fragmentary bottom plan view of a vehicle underbody incorporating an arrangement for an oil cooler for a final drive unit according to a further embodiment of the present invention.
Figure 5:
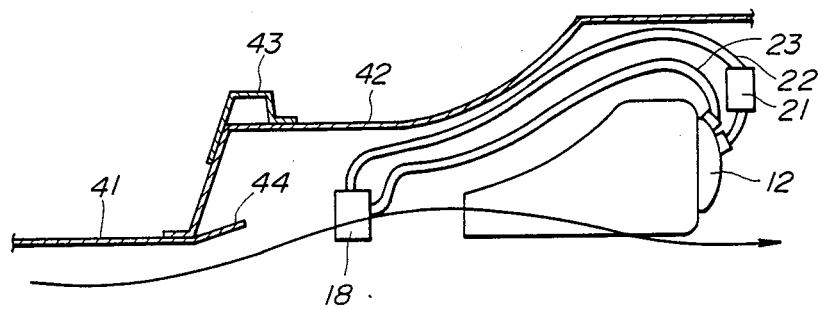
FIG. 5 is a side elevation of the vehicle underbody of FIG. 4.

FIGS. 4 and 5 show a further embodiment wherein a vehicle underbody 40 includes a front floor panel 41, a rear floor panel 42 and a rear seat cross member 43 arranged above the front end portion of the rear floor panel 42. The front floor panel 41 has a rear end extension 44 which extends rearwardly and upwardly from the joint between the front floor panel 41 and the rear floor panel 42. The rear end extension 44 is adapted to serve as a deflector and is directed toward the upper end of the oil cooler 18 so that air flow caused by movement of the vehicle is efficiently introduced to the oil cooler 18 to produce substantially the same effect as is the previous embodiment of FIG. 3.

Figure 6:
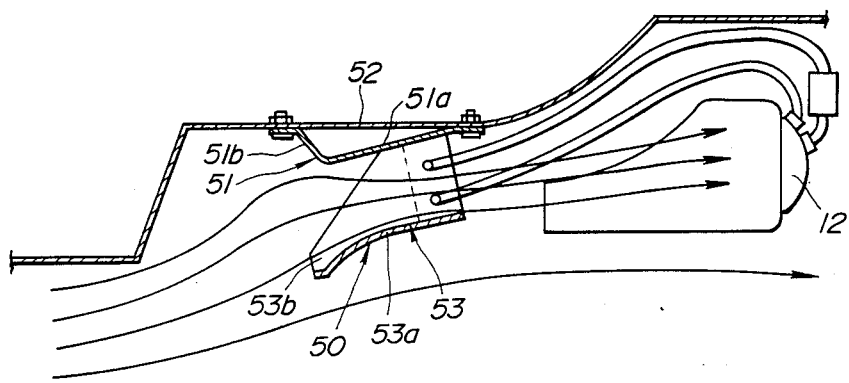
FIG. 6 is a view similar to FIG. 5 but showing a further embodiment of the present invention.
Figure 7:
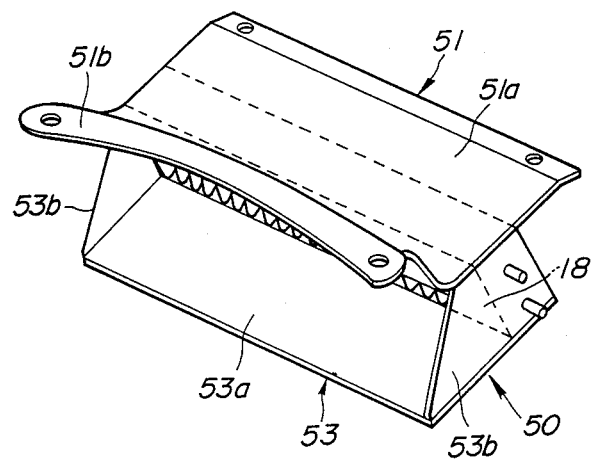
FIG. 7 is a perspective view of an oil cooler employed in the arrangement of FIG. 4.
Figure 8:
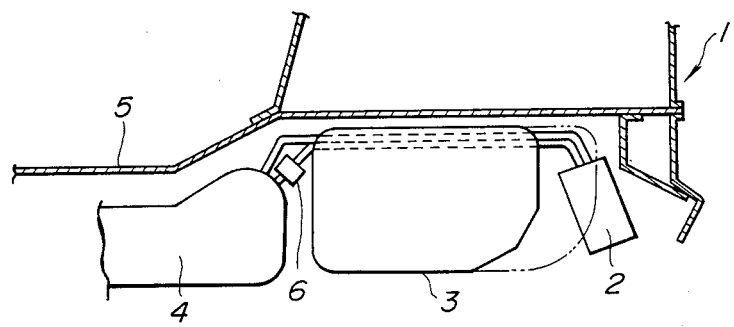
FIG. 8 is a side elevation similar to FIG. 2 but showing the prior art arrangement.

FIGS. 6 and 7 show a further embodiment wherein a bracket means 50 is provided not only for installing the oil cooler 18 on the rear floor panel 52 but for efficiently introducing air to the oil cooler 18. The bracket means 50 consists of a bracket 51 and an air duct 53. The bracket 51 has a flat deflector wall 51a extending forwardly and downwardly from the oil cooler for deflecting air streams flowing along the vehicle floor toward the oil cooler 18. The air duct 53 has a channel-like cross section and cooperates with the bracket 51 to house and support the oil cooler 18. The air duct 53 has a bottom wall 53a and a pair of side walls 53b. The bottom wall 53a and side walls 53b extend forwardly from the oil cooler 18 and cooperate with the bracket 51 to define an air introducing passage having a rectangular cross section which increases as it extends nearer to the front end of the bracket means 50. More specifically, the bracket 51 is angled to have, in addition to the aforementioned deflector wall 51a, another flat deflector wall 51b which extends forwardly and upwardly from the forward end of the flat deflector wall 51a. The bracket portion 51 is bolted or otherwise secured at the front and rear ends thereof to the rear floor panel 52. The bottom wall 53a of the air duct 53 curves downwardly or slants downwardly with an increasing slope towards its forward end. Each side wall 53b has an upper edge, the forward part of which is separated from the bracket 51 and extends increasingly away from the bracket portion 51 as it extends nearer to the forward end of each side wall 53b.

With this arrangement, an increased amount of cooling air can be introduced to the oil cooler 18, whereby it becomes possible to attain a predetermined cooling of lubricating oil with a small-sized oil cooler and thereby reduce the vehicle weight. At the same time it becomes possible to reduce the restrictions on installation of the oil cooler.

What is claimed is:

1. An oil cooler arrangement for a vehicle comprising:
   a rear seat;
   a vehicle floor having a rear elevated portion on which said rear seat is installed;
   a propeller shaft which has a rear end and which is disposed under said vehicle floor;
   an exhaust system which is disposed under said vehicle floor on one side of said propeller shaft;
   a final drive unit which is connected to the rear end of said propeller shaft; and
   an oil cooler for said final drive unit, said oil cooler being disposed under said vehicle floor on the opposite side of said propeller shaft from the exhaust system and being supported by said rear elevated portion.

2. An arrangement as claimed in claim 1, wherein said oil cooler is disposed forward of said final drive unit.

3. An arrangement for an oil cooler of a vehicle comprising:
   a rear seat:
   a vehicle floor having a front floor panel, a rear floor panel having an elevated portion on which said rear seat is installed, and a rear seat cross member; and
   an oil cooler for a final drive unit, said oil cooler being disposed under said vehicle floor and supported by said elevated portion of said rear floor panel,
   said rear seat cross member being disposed under a front end of said rear floor panel and having an inclined wall which is inclined with respect to said front floor panel and which is directed toward an upper end of said oil cooler.

4. An oil cooler arrangement for a vehicle comprising:
   a rear seat:
   a vehicle floor having a front floor panel, a rear floor panel jointed to said front floor panel and having an elevated portion on which said rear seat is installed, and a rear seat cross member; and
   an oil cooler for a final drive unit, said oil cooler being disposed under said vehicle floor and being supported by said elevated portion of said rear floor panel,
   said rear seat cross member being disposed above a front end portion of said rear floor panel, said front floor panel having a rear end extension which extends rearwardly and upwardly with respect to said front floor panel from the joint between said front floor panel and said rear floor panel and which is directed toward an upper end of said oil cooler.

5. An oil cooler arrangement for a vehicle comprising:
   a rear seat;
   a vehicle floor having a rear elevated portion on which said rear seat is installed;
   an oil cooler for a final drive unit; and
   bracket means for installing said oil cooler on an underside of said rear elevated portion of said vehicle floor, said bracket means having a bracket and an air duct which cooperate to define a box-shaped section and house said oil cooler, said bracket being angled to have a first flat deflector wall extending forwardly and downwardly from said oil cooler and a second flat deflector wall extending forwardly and upwardly from a front end of said first flat deflector wall, said air duct having a bottom wall and a pair of side walls, said bottom wall extending forwardly from said oil cooler and slanting downwardly with an increasing slope as it extends forwards, each of said side walls having an upper edge the forward part of which is separated from said bracket and extends increasingly away from said bracket as it extends forwards.

6. An arrangement as claimed in claim 5 wherein said bracket is secured at the front and rear end thereof to said vehicle floor.

* * * * *